AUTOMATIC READING DEVICE

Filed March 17, 1958 4 Sheets-Sheet 1

INVENTORS
BORJE THORSTENSSON HELLSTRÖM
BENGT INGEMAR LINDBLAD

BY Pierce, Scheffler & Parker
their ATTORNEYS

AUTOMATIC READING DEVICE

Filed March 17, 1958 4 Sheets-Sheet 2

INVENTORS
BÖRJE THORSTENSSON HELLSTRÖM
BENGT INGEMAR LINDBLAD

BY Pierce, Scheffler & Parker
their ATTORNEYS

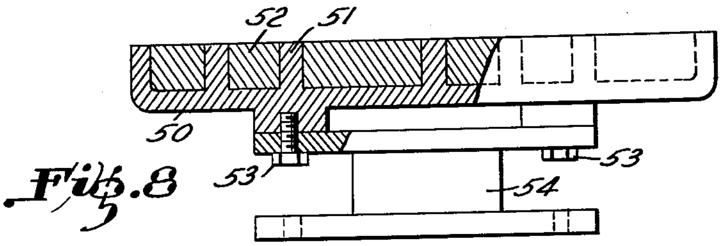
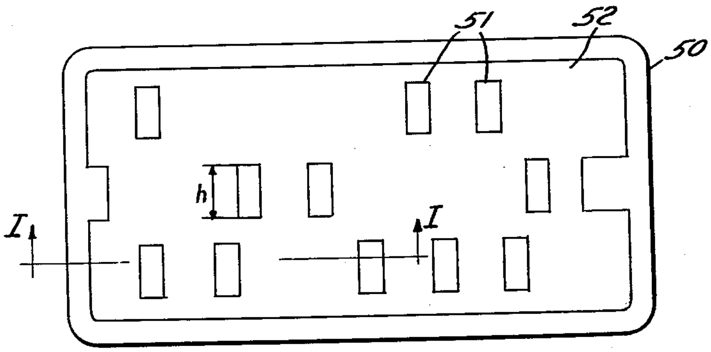
Fig. 9
Fig. 15
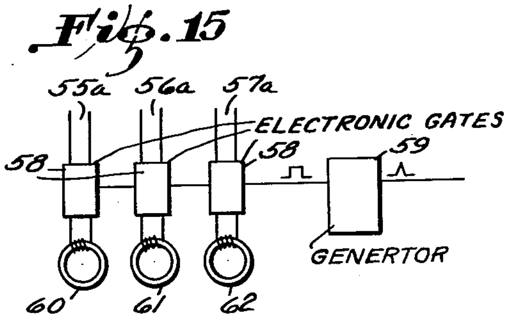
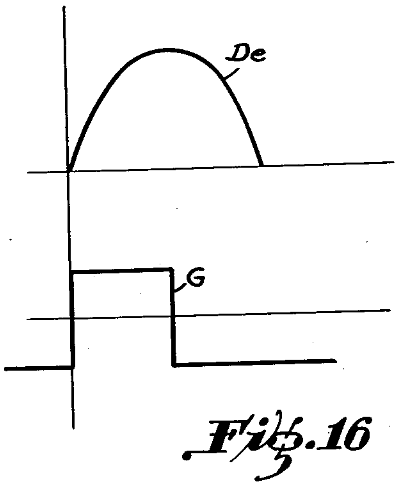
INVENTORS
BÖRJE THORSTENSSON HELLSTRÖM
BENGT INGEMAR LINDBLAD
BY Pierce, Scheffler & Parker
their ATTORNEYS

AUTOMATIC READING DEVICE

Filed March 17, 1958 4 Sheets-Sheet 4

INVENTORS
BÖRJE THORSTENSSON HELLSTRÖM
BENGT INGEMAR LINDBLAD

BY Pierce, Scheffler & Parker
their ATTORNEYS

United States Patent Office 3,067,409
Patented Dec. 4, 1962

3,067,409

AUTOMATIC READING DEVICE

Börje Thorstensson Hellström, Bromma, and Bengt Ingemar Lindblad, Farsta, Sweden, assignors to LKB-Produkter Fabriksaktiebolag, Stockholm, Sweden, a company of Sweden Filed Mar. 17, 1958, Ser. No. 721,816
Claims priority, application Sweden Mar. 18, 1957
11 Claims. (Cl. 340—174.1)

The present invention relates to a device for the automatic reading of characteristic numbers, in particular for reading and recording numbers on movable objects which are conveyed past a reading place, for instance railway cars, whose numbers one has to be able to read rapidly and safely for accurate car shunting, independently of the speed with which the cars are conveyed. As regards this field of application the invention relates particularly to a device which operates safely even in trying climatic conditions and which is irresponsive to dirt and other external disturbances.

The device according to the invention is characterized in that it contains a sensing member with a number of reading elements in the form of coils which, at least at the instant of reading, are pervaded by a magnetic flux and are so arranged that their magnetic fluxes at each instant may be affected by means of metallic or ferromagnetic indicating cores whose positions then are such that the cores univocally denote in an arbitrary code system the characteristic number of the object, and a device for determining those coils whose magnetic fluxes have been affected by the indicating cores during reading.

The device according to the invention will be described in greater detail in the following with reference to the attached drawings which show a device suitable for reading the number on railway cars.

Figure 1:
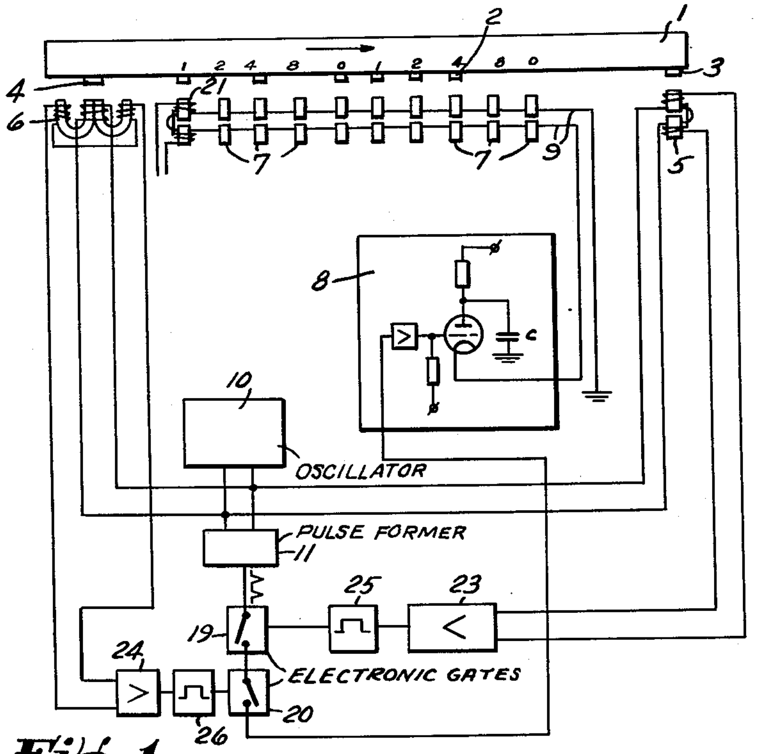
Figure 4:
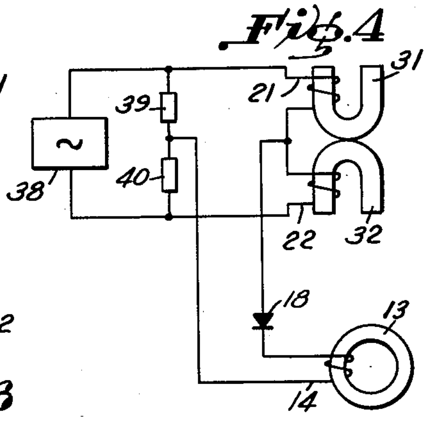
Figure 2:
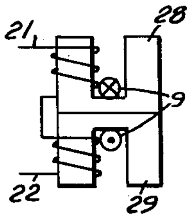
Figure 3:
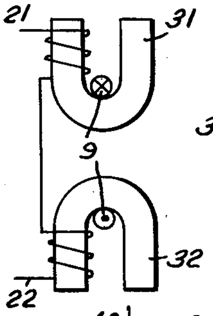
Figure 5:
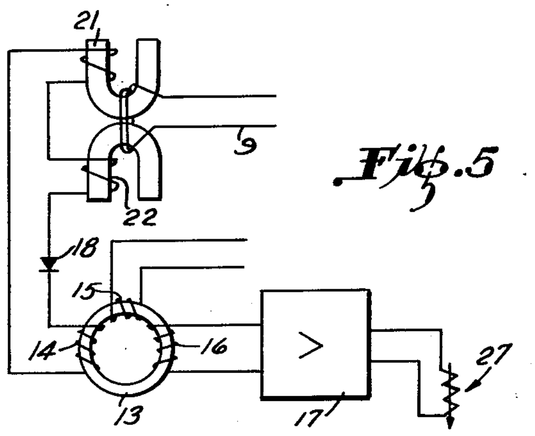
Figure 6:
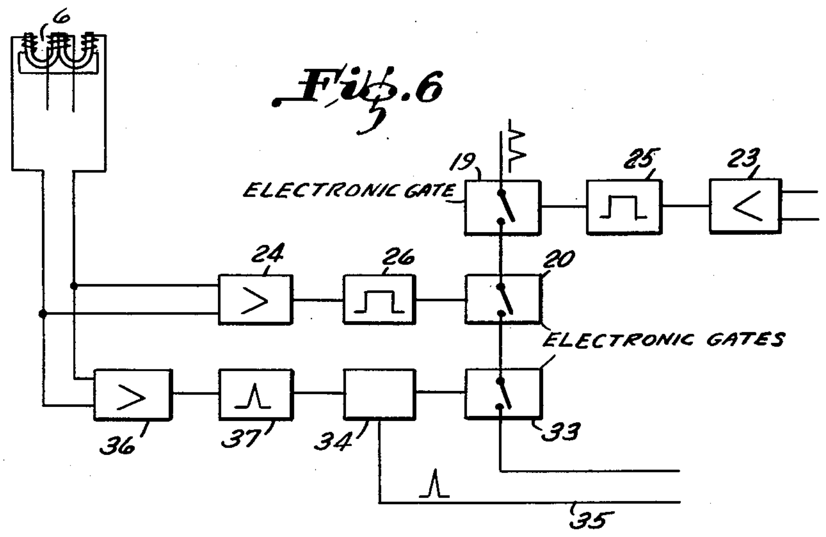
Figure 7:
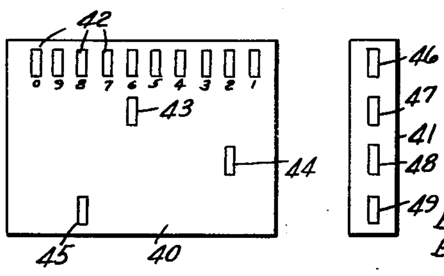
Figure 10:
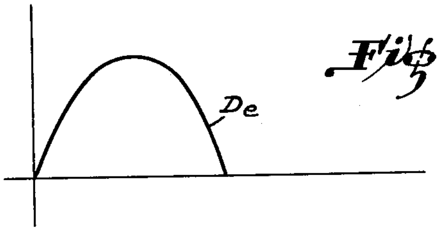
Figure 11:
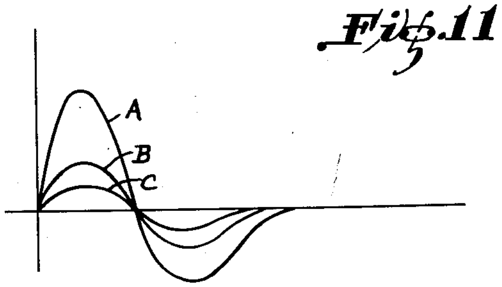
Figure 12:
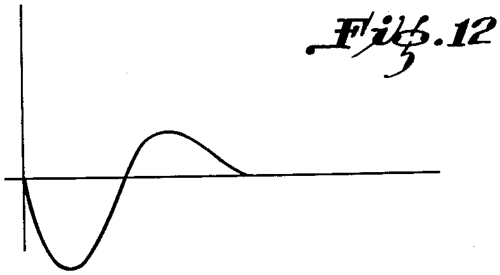
Figure 13:
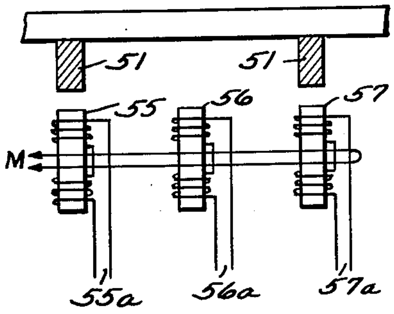
Figure 14:
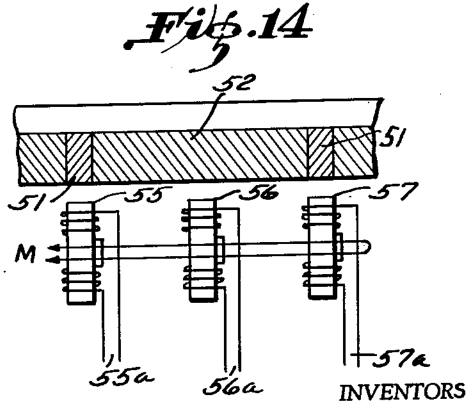

FIGURE 1 shows a diagram of one embodiment of the device according to the invention. FIGURES 2, 3 and 4 illustrate various designs of the differential transformers which constitute the sensing member. FIGURE 5 shows one embodiment of a device for recording the pulses arriving from the sensing member. FIGURE 6 shows a device for preventing the recording from being repeated. FIGURE 7 shows a device for successive reading. FIGURE 8 shows a modified number plate according to the invention, partly in a longitudinal section along line I—I in FIGURE 9; FIGURE 9 shows the member plate according to FIG. 8 in plan view; FIGURE 10 shows diagrammatically a current pulse for exciting of the reading elements of the sensing member; FIGURE 11 shows different output voltages from the reading elements by pulsing with current according to FIGURE 10; FIGURE 12 shows the output voltage from a reading element which is unaffected by any ferromagnetic core of a number plate according to the invention by pulsing with current according to FIGURE 10; FIGURE 13 shows a part of the device as shown in FIGURE 1; FIGURE 14 shows a part of the device corresponding to that as shown in FIGURE 13 and with the number plate constructed as shown in FIGURE 8; FIGURE 15 shows a gate device for preventing of erroneous readings; FIG. 16 illustrates the working principles of the device according to FIGURE 15.

In the device illustrated in the drawings, 1 denotes a number plate disposed on a railway car, the longitudinal extension of said plate coinciding with the direction of motion of the car. It is assumed that the number plate moves in the direction of the arrow. On the number plate a number of indicating cores 2 are arranged in the shape of rods of a ferromagnetic, metallic or other electrically conducting material, for instance, iron, copper, aluminum or sintered material, e.g. such known by the name of "Ferroxcube." The rods are disposed in such a manner that they univocally denote a characteristic number in an arbitrary code system. In the case illustrated, the rods are assumed to be ferromagnetic and placed according to a combined binary and decimal code.

At the side of the railway track a sensing member is stationary arranged. This sensing member comprises a number of differential transformers 7 having cores with a common primary winding 9 thereon, said cores having legs upon which are wound in opposition the secondary coils 21 and 22. As long as the magnetic fluxes through the iron cores of the two counter-wound coils are undisturbed, the resulting secondary voltage from coils 21 and 22 is zero or practically zero. In case a rod 2 is situated straight in front of the core of coil 21 when the coils are excited over the primary winding 9, the magnetic flux in this core will be stronger than in the core of coil 22, and accordingly the voltage induced in coil 21 will be stronger than the voltage induced in coil 22, whereby a resulting secondary voltage of a measurable order of size is obtained. All rods 2 are so disposed on the number plate that the rods will be respectively opposite predetermined differential transformers 7 at a given period of time as the car passes the reading place.

The primary winding 9, common to all differential transformers 7, is fed with current pulses of short duration from a thyratron unit 8 of a design known per se. As will be described in greater detail below, means are provided for releasing these current pulses at exactly the point of time when the rods 2 are directly opposite the corresponding differential transformers 7.

On the car number plate two starting rods 3 and 4 are disposed, said starting rods being essentially of the same material as rods 2.

The starting rods 3 and 4 are always located on the same place on the number plate regardless of the number presented thereon. Two stationary starting transformers 5 and 6 are so arranged that the two starting rods find themselves directly opposite their respective transformers at the same moment. The transformer 5 is a differential transformer of the same type as the transformers 7 described above. The transformer 6 is a differential transformer producing an output voltage, the amplitude and phase of which being dependent on the position of the rod 4 relative to the vertical plane passing symmetrically through the transformer 6 normal to the direction of motion of the car.

The primary windings of the two starting transformers 5 and 6 are supplied from an oscillator 10. When the two starting rods 3 and 4 approach the transformers 5 and 6, these start to generate output voltages which by means of amplifiers 23 and 24, respectively, and wave forming units 25 and 26, respectively, are transformed into square waves and control so called gates 19 and 20 of the electronic tube type, respectively, through which the thyratron unit 8 is connected to the oscillator by way of the pulse forming network 11, and which make and break in accordance with the polarity changes of the square wave signals. As long as the starting rod 4 is to the left of the symmetrical plane of the transformer 6, the two square wave signals are in phase opposition. This means that the gates 19 and 20 are never open for passage of signals simultaneously. Hence, the connections between the oscillator 10 and the thyratron 8 is broken. At the very instant when the starting rod 4 passes the symmetrical plane of the transformer 6, the phase of the square waves generated by this transformer is reversed 180 degrees, whereby these waves fall in phase with the square waves generated by transformer 5. This means that the gates 19 and 20 will make and break simultaneously and a pulse from the pulse forming network 11 can thus pass on to the thyratron 8 which then emits a current pulse through the primary windings 9 of the differential transformers 7.

When receiving such a current pulse from the thyratron, the differential transformers in the sensing member will produce a measurable output voltage, or they will not produce such a voltage, depending on which transformers are affected by a rod in the manner stated above. The secondary leads from each differential transformer 7 communicate by way of a rectifier 18 with a memory means consisting of a suitably ring-shaped, magnetizable iron core 13, for instance of ferritic material, about which the lead from the transformer 7 forms a coil 14, see FIG. 5. Thus the output voltage from transformer 7 will energize the core 13 to store therein the information that a number rod 2 has, at the moment of reading, been directly opposite the transformer 7 in question.

This information stored in the memory means 13 can be used immediately or later for a transcription according to known methods. Thus a pulse may be supplied to the memory means 13 through a coil 15. If the core 13 then has a state of magnetization which differes from its original zero state, a voltage will be induced in the output winding 16 and this voltage is used, after it has been amplified in an amplifier 17 for releasing a mechanical movement for punching holes in a tape or in a punch-card or the like or for printing a plain text. For this purpose there are many known devices which shall not be described here. Such a known device is designated 27 in FIG. 5.

On the number plate shown in FIG. 1 the rods 2 are arranged in one line. If one line should be inconveniently long, the number rods may be placed in two or more lines, suitably parallel. The principle of function of the device is by no means changed hereby.

It is important to note that the number rods 2 pass so close to the transformer 7 that the magnet fluxes of the coils are varied sufficiently to produce a recordable output voltage. In order to prevent cantings of the car from obstructing the reading, the number plate is suitably placed on an unsprung portion of the car, for instance, on the wheel bearing boxes.

In lieu of the memory described above other known devices may be used, for instance, relays, cold cathode tubes or relaxation circuits with thermionic tubes or transistors.

The differential transformers 7 may be made in accordance with FIGURES 2, 3 or 4. In the embodiment according to FIG. 2, two U-cores 28, 29 are arranged adjacent one another. The device according to FIG. 3 differs from the device according to FIG. 2 merely by the fact that the cores 31, 32 are C-cores which have been placed slightly spaced. In the cases shown the two cores of the differential transformers are disposed comparatively close to one another, but they may of course by arranged arbitrarily spaced and also be designed differently from one another if only the combination as such operates as a differential transformer in the manner described above.

The differential transformers according to FIGURES 2 and 3 are provided with a special primary winding 9, as stated hereinbefore. In the embodiment according to FIG. 4 there is no such primary winding but the two coils 21, 22 are connected instead to an oscillator 38 by means of which the magnetic fluxes in the cores 31, 32 are generated. At unbalance between these magnetic fluxes a voltage is obtained across a center tapping between the coils and a center tapping between two impedances 39, 40 which are connected across the output terminals of the generator 38, and this voltage is recorded in the memory 13. The coils 21 and 22 may be different with one another if the impedances 39, 40 are dimensioned with this taken into consideration.

In the device shown in FIG. 1, the number is thus read and recorded momentarily at the instant when the car is at a certain, predetermined point. However, it may occur that the car happens to stop exactly in the position of reading. In order to prevent repeated recordings in this case, the device is suitably supplemented with blocking circuits.

Such a blocking device for preventing repeated recording is illustrated in FIG. 6. In the device according to this figure a further gate 33, similar to gates 19 and 20, is arranged in series with the gates 19 and 20. This gate 33 is controlled by a relaxation circuit 34 which by way of the lead 35 communicates with the anode circuit of the thyratron and which is reset, when a reading pulse is emitted from the thyratron, so that the gate 33 is closed. Thereupon the gate 33 should not open until the number plate 1 has passed the reading member and the information stored in the memory 13 has been extracted, and the memories have been restored to their original zero position. The transferring of the information from the memories may occur immediately after recording in the memories has taken place, and it is always completed before the next car arrives at the reading member. The gate may then be open at the moment when the rod 3 on the number plate of the subsequent car passes the starting transformer 6 of the reading member. For this purpose there is arranged an amplifier 36 and a pulse forming network 37, which at the phase reversing in the secondary circuit of the differential transformer 6 emits an impulse for resetting the relaxation circuit 34 so that the gate 33 is opened and remains open until the pulse for reading has been emited from the thyratron.

In those cases when the trains, for instance during loading, are driven by fits and starts and sometimes also are moved backwards a little, the restoring of the relaxation circuit 34 for opening the gate 33 must either be performed by a manual operation or by a device which, for instance, makes contact only after a car interspace has passed and thereby prevents the same car number from being repeatedly recorded.

The device shown in FIG. 1 implies that the cars carrying the number plates 1 pass from left to right as viewed in the figure, and the winding of the starting transformers 5 and 6 is assumed to be made with this borne in mind. In case the cars pass in the opposite direction, the thyratron will strike at an incorrect position of the number plate in a relationship to the reading member, that is, before the second starting core arrives at the symmetrical plane of the starting transformer 6, and an erroneous number will be recorded. However, the device according to FIG. 1 can be used for reading in both directions of movement if the two coils of the starting transformer 6 are made reversible or if the phase position in the amplifier 24 and the wave generator 26 is made phase displaceable 180 degrees.

A momentary reading may also be carried out by a simple modification of the device according to FIG. 1. According to this figure, the number rods 2 and the differential transformers 7 are arranged in lines, parallel to the direction of movement of the car. If, however, the number rods and the transformers are placed at right angles to direction of movement of the car, and the car passes the reading point with speed sufficiently high, all number rods will pass their respective transformers simultaneously and so rapidly that the reading becomes practically speaking momentary. No reading pulse, exciting the differential transformers at the moment of reading only, is therefore needed in this case, but the transformers may be constantly excited by means of an alternating voltage.

However, the device according to the invention may also be accomplished for a successive reading. For instance, this can be carried out in such a way that, concerning a 6-figure system, six transformers 7 according to FIG. 1 are placed vertically at right angles to the direction of movement of the car and that the binary code is replaced by a decimal system so that 0–9 rods are disposed in each of the positions (levels) corresponding to the transformers 7, the rods being positioned one after the other in the direction of movement of the car. According as such a line of number rods passes the coordinated differential transformer, which should be constantly excited, the transformer emits a number of impulses corresponding to the number of rods, which impulses are recorded by a counter in a manner known per se.

A modification of a device for successive reading is shown in FIG. 7, where a number plate 40 and a reading member are arranged for recording in the decimal system three-figure numbers at the most. On the number plate 40 there is disposed, firstly, one line with ten rods 42, each corresponding to a figure, and, secondly, as many lines as there are figures in the number, each line having a rod 43, 44 and 45, respectively, which is placed directly opposite that rod 42 whose figure it represents. On the plate shown the number 628 is indicated. The reading member 41 has differential transformers 46, 47, 48 and 49, respectively, one for each line on the number plate. The transformers 46–49 are excited all the time the plate 40 passes the reading point. When the reference core representing the figure 2 is above the differential transformer 46, the transformer 48 is simultaneously off balance and a two is recorded as the second figure of the number an so on.

The modification described above may also be used in such a way that a counting of impulses (up to 9) is started simultaneously in 3 registors (for 3-figure numbers, according to FIG. 7) as the transformer 46 is brought along the reference line and emits output impulses during passage of each rod relative thereto. The counting in the respective registers is stopped by the rods 43, 44, 45 immediately after the corresponding impulse has been recorded. In this case, when the number plate is assumed to move from left to right, the 0-rod in the reference line should be placed to the extreme right.

An arbitrary code, for instance a binary one, may of course be used.

A successive reading can also take plate in using a number plate of the type shown in FIG. 1. All differential transformers 7 shown in FIG. 1 are then replaced by one such transformer, the number to be recorded being characterized by the length of the time intervals between the the output impulses which follow by turn from this single transformer.

A condition precedent for such a device is the fact that the car or the object, whose number is to be indicated, always moves with a constant speed.

The device according to the invention has been described with reference to a stationary reading member and a movable number plate. As a matter of principle, the number plate may of course be arranged stationary and the reading member movable, for instance, in a railway, car.

The invention is not limited to the embodiment shown in the drawings but may be modified in various ways without departing from the concept of the invention. Thus, for instance, the thyratron shown may be replaced by a relay. Furthermore, it is not necessary to use two starting transformers 5 and 6. One single such transformer may be sufficient if the direction of movement of the car always is the same and if no other magnetically or electrically conducting objects on the car come so close to the reading device as to bring the transformer off balance. This single transformer should in such a case be of the type which is denoted by reference numeral 6 in FIG. 1. At the direction of movement indicated in FIG. 1, it must be positioned as the transformer 5 in FIG. 1. In this case also the reading may take place when the rods of the number plate are exactly in front of the respective differential transformers 7 if the change of phase in the indicating transformer is utilized for starting the reading pulse. A transformer of the same type as the transformer 5 may also be used if the distance between the differential transformers 7 is sufficiently great so that a number rod can not affect the magnetic flux in the wrong transformer 7 at the reading. If the number plate always passes in front of the reading device at exactly the same distance, the distance between these differential transformers need not be greater than when using two indicating transformers, but if the passage occurs at varying distances the differential transformers 7 must be considerably spaced.

It shall be pointed out that the output voltages obtained from the reading elements may also be utilized for a direct operation of relays and the like, which either indicate optically the number read or in turn actuate some recording device 27 of the kind stated above. It may also be conceived that the pulse emission to the reading elements may be started by means of some mechanical tripping mechanism, e.g. a switch coacting with a shoulder arranged upon the movable object.

In the above described arrangements the distance between the sensing member and the indicating cores may not be too great if a reading shall be permitted. In certain cases it may be found desirable, however, to provide for reading at a greater distance or to provide for a more accurate reading at a predetermined distance.

For such purposes it is possible to provide indicating cores consisting of a ferromagnetic material and arranged in a shallow tray into which is moulded between the cores a non-magnetic material of high conductibility, such as nonmagnetic material of high conductibility, preferably aluminium, copper, magnesium or the like. One embodiment for the above mentioned purpose will be described now in more details with reference to FIGS. 8–16 in the drawings.

FIG. 8 illustrates a number plate in the form of a shallow tray 50 wherein a number of indicating cores 51 of ferromagnetic material are arranged. Into the tray 50 is moulded a filling 52 of a nonmagnetic material of high conductibility, e.g. aluminium, copper, magnesium or the equivalent. It is also possible to use a suitable plastic material for the uppermost layer of the filling 52. At the rear side the number plate is secured to a lengthening-piece 54 as by screws 53 which lengthening-piece preferably consists of a nonmagnetic material of high conductibility and is arranged to be secured to e.g. a railway car. The tray 50 is surrounded by a low edge portion and where an indicating core 51 is disposed adjacent said edge portion it may be formed integrally therewith. The indicating cores 51 may be formed integrally with the bottom of the tray 50, but it is also possible to construct the cores as separate units which are placed on the bottom of the tray prior to the moulding of the filling 52 into the tray. In the last mentioned case it is possible to provide the bottom of the tray with a plurality of low beads or projections for aligning the cores when they are placed into the tray, or the bottom may be provided with a plurality of holes into which pins on the cores are inserted when the cores are placed into the tray. Although not shown it is also possible to provide the tray and the indicating cores with projections, recesses or equivalent means to secure the engagement between the filling 52 and the tray 50 or the cores 51, respectively.

The cores 51 are preferably of a greater height than the minimum height necessary to obtain the indication, so that the effect on the magnetic fluxes of the reading element is achieved even if the number plate should become slightly displaced on its support.

The working principles of the device according to this embodiment will now be described with reference to FIGS. 10–14, whereby it is supposed that a reading element, i.e. one of the differential transformers 55, 56, 57, FIGS. 13–14, which has its magnetic flux affected by an indicating core 51 represents "1" and unaffected reading elements represent "0" in a combined binary and decimal code.

By pulsing with a current according to FIG. 10 through the primary windings M there will be obtained output voltages according to FIG. 11 from the differential transformers 55, 56, 57 by using a number plate according to FIG. 13, corresponding to FIG. 1. The curve A thereby represents the output voltage of the affected transformers 55 and 57 by a small distance between the transformers and the number plate at the moment of reading, curve B represents the same output voltages by a greater distance between the transformers 55, 57 and the number plate and curve C, represents the output voltage of the unaffected differential transformer 56 by a small distance between the transformers and the number plate. It will be noted that the difference between "1" and "0" in certain cases may be rather insignificant, as shown by curves B and C.

In order to remedy this disadvantage the number plate in this embodiment is constructed in accordance with FIGS. 8, 9 and 14. By utilizing a pulsating current according to FIG. 10 there will be obtained from the differential transformer 56—the magnetic flux of which is not affected by any ferromagnetic indicating core 51—an output voltage according to FIG. 12, e.g. a voltage the first part of which is negative and thus may be readily distinguished from a positive voltage pulse, corresponding to "1."

As shown in FIG. 12, however, the voltage of the differential transformer 56 will pass through zero and become positive when the pulsing current reaches its maximum value and starts to diminish, FIG. 10. The memory unit in which the signal received from each transformer is stored should therefor be made insensible for the positive voltage part of the signal for "0."

For this purpose it is preferred to use the device according to FIG. 15. As shown the outputs 55*a*, 56*a*, 57*a* of the differential transformers are connected to electronic gates 58 which are connected to a common generator 59 for generating gate pulses of the shape illustrated in FIG. 16. The signals from the differential transformer may only pass through to the memory units 60, 61, 62, respectively, when the gates 58 are open, i.e. from the beginning of the current pulse D*e* for excitation of the differential transformers, and until this current pulse reaches its maximum value. The opening time of the gates is represented by that part of the curve G in FIG. 16, which is disposed above the zero line. The device may, of course, also be so constructed that the gates 58 are normally open but will be closed immediately before the positive voltage pulse for "0" reaches them and are maintained closed until that the pulse has died out.

We claim:

1. Apparatus for automatically reading the characteristic designation of a movable object comprising a number of magnetic members secured to said movable object, said magnetic members being arranged to form the characteristic number in a code system; a plurality of stationary differential transformers positioned adjacent said magnetic members, each of said differential transformers having separate secondary windings and all of said differential transformers having a common primary winding, the secondary windings of each of said differential transformers consisting of a pair of oppositely-wound series-connected coils; means for applying pulses to said common primary winding only when said movable object is at a predetermined position relative to said stationary differential transformers comprising a first magnetic starting rod secured to said movable object adjacent said magnetic members, a first stationary starting transformer adjacent said differential transformers, a source of electrical pulses, and normally-open gate means connecting said source of pulses to said common primary winding, said gate means being operable to a closed position by said first starting transformer when said starting rod is directly opposite therefrom to pass electrical impulses to the primary windings of all of said differential transformers, the magnetic flux of only those ones of said differential transformers which are directly opposite respective magnetic members being affected by the movement of said magnetic members relative to said stationary differential transformers to produce output voltages from said secondary windings; and means connected to the secondary windings of said differential transformers for indicating those ones of said differential transformers which are opposite said magnetic members at said given instant of time.

2. Apparatus as defined in claim 1 wherein said means for applying pulses to said common primary winding only when said movable object is at a predetermined position relative to said stationary differential transformer further includes a second magnetic starting rod secured to said movable object adjacent said magnetic members, a second stationary starting transformer adjacent said differential transformers and opposite said second starting rod when said first starting rod is opposite said first starting transformer, said second starting transformer having a plane of symmetry normal to the direction of travel of said movable object, and further wherein said gate means comprises normally-open first and second series-connected gating devices, said first gating device being operable by said first starting transformer and said second gating device being operable by said second starting transformer.

3. Apparatus as defined in claim 2 wherein said starting rods and said magnetic members are colinearly arranged in the direction of travel of said movable object, said magnetic members being arranged intermediate said first and second starting rods.

4. Apparatus as defined in claim 2 wherein said source of electrical pulses comprises an oscillator, and further including thyratron tube means connected intermediate said gate means and said primary winding, the operation of said thyratron tube means being controlled by said oscillator.

5. Apparatus as defined in claim 1 wherein the oppositely-wound secondary windings of each of said differential transformers are physically separated from each other.

6. Apparatus as defined in claim 1 wherein said means for indicating those ones of said differential transformers which are opposite said magnetic members at said given instant of time further includes memory means comprising a magnetizable iron core, and a magnetizing winding wound upon said iron core and connected to said secondary windings.

7. Apparatus as defined in claim 2 and further including wave forming means connected intermediate said first starting transformer and said first gating device and intermediate said second starting transformer and said second gating device for transforming the control signals to said gates to square waves, and further including means for displacing the phase of one of said square waves 180 degrees.

8. Apparatus as defined in claim 7 and further including third gate means connected in series with said first and second gating devices, and relaxation circuit means controlling the operation of said third gate means, said relaxation circuit means being jointly operable by said second starting transformer and by the anode circuit of said thyratron tube means.

9. Apparatus as defined in claim 8 wherein the cores of said differential transformers consist of a ferro-magnetic material, said cores being arranged in a small tray including portions of non-magnetic material of high conductivity extending between said cores.

10. Apparatus as defined in claim 9 wherein said cores are formed integrally with the bottom of said tray and with an edge portion thereof.

11. Apparatus as defined in claim 9 wherein said cores are removably positioned in said tray, said cores having pin means thereon extending into corresponding recesses in said tray.

References Cited in the file of this patent

UNITED STATES PATENTS

| | | |
|---|---|---|
| 2,237,254 | Broekhuysen | Apr. 1, 1941 |
| 2,628,572 | Le Goff | Feb. 17, 1953 |
| 2,877,718 | Mittag | Mar. 17, 1959 |